United States Patent
Werner et al.

(10) Patent No.: US 9,848,528 B2
(45) Date of Patent: Dec. 26, 2017

(54) METHOD FOR PLANTING SEEDS OR PLANTS AND A CORRESPONDING MACHINE

(71) Applicant: Deere & Company, Moline, IL (US)

(72) Inventors: Roland Werner, Edingen-Neckarhausen (DE); Christian Bartolein, Birkenheide (DE); Kilian Wolff, Mandelbachtal (DE); Marcus Reutemann, Edingen-Neckarhausen (DE); Uwe Vollmar, Zweibruecken (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/264,897

(22) Filed: Sep. 14, 2016

(65) Prior Publication Data
US 2017/0071124 A1    Mar. 16, 2017

(30) Foreign Application Priority Data
Sep. 14, 2015  (DE) .................. 10 2015 217 496

(51) Int. Cl.
*A01C 21/00* (2006.01)
*G01S 19/13* (2010.01)
*A01C 7/00* (2006.01)

(52) U.S. Cl.
CPC .............. *A01C 21/005* (2013.01); *A01C 7/00* (2013.01); *G01S 19/13* (2013.01)

(58) Field of Classification Search
CPC .......... A01C 21/005; A01C 7/00; G01S 19/13

USPC .......................................................... 701/50
See application file for complete search history.

(56) References Cited

U.S. PATENT DOCUMENTS

| | | | | |
|---|---|---|---|---|
| 5,809,440 A | * | 9/1998 | Beck | G06F 12/0684 47/1.7 |
| 6,070,539 A | * | 6/2000 | Flamme | A01B 79/005 111/177 |
| 6,199,000 B1 | * | 3/2001 | Keller | A01B 79/005 342/357.52 |
| 6,516,271 B2 | * | 2/2003 | Upadhyaya | A01B 79/005 56/10.2 A |
| 6,553,312 B2 | * | 4/2003 | Upadhyaya | A01C 21/005 342/357.31 |

(Continued)

FOREIGN PATENT DOCUMENTS

| | | |
|---|---|---|
| DE | 19961442 A1 | 7/2001 |
| DE | 10251114 A1 | 5/2004 |

(Continued)

OTHER PUBLICATIONS

O. Schmittmann et al., "Development of a Precision Planter Drive for Coordinate-Controlled Planting of Seeds," Landtechnik 2010, 286.

(Continued)

*Primary Examiner* — Tyler J Lee

(57) ABSTRACT

In accordance with an example embodiment, a method and a machine for planting seeds or plants in a field to enable a planting of the seeds or plants in an established spacing based on two-dimensional coordinates output by a positioning system and the slope of the field in the working direction.

10 Claims, 3 Drawing Sheets

(56) References Cited

U.S. PATENT DOCUMENTS

| | | | | |
|---|---|---|---|---|
| 7,726,251 B1* | 6/2010 | Peterson | ............... | A01C 7/046 |
| | | | | 111/185 |
| 8,078,367 B2* | 12/2011 | Sauder | ............... | A01B 79/005 |
| | | | | 111/200 |
| 8,850,997 B2* | 10/2014 | Silbernagel | ........... | A01C 7/046 |
| | | | | 111/185 |
| 9,179,595 B2* | 11/2015 | Kormann | ............ | A01C 21/005 |
| 2014/0076216 A1* | 3/2014 | Kormann | ............ | A01C 21/005 |
| | | | | 111/170 |
| 2016/0057920 A1* | 3/2016 | Spiller | ............... | A01B 69/008 |
| | | | | 701/23 |

FOREIGN PATENT DOCUMENTS

| | | |
|---|---|---|
| DE | 102005010686 A1 | 10/2005 |
| DE | 102007040511 A1 | 3/2009 |
| DE | 102012203761 A1 | 9/2013 |
| EP | 1475609 A2 | 11/2004 |
| EP | 2517545 A1 | 10/2012 |

OTHER PUBLICATIONS

Jin, et al., Coverage Path Planning on Three-Dimentional Terrain for Arable Farming, Journal of Field Robotics, 28(3), 424-440 (2011).
I.A. Hameed, Intelligent Coverage Path Planning for Agricultural Robots and Autonomous Machines on Three-Dimensional Terrain, J. Intell. Robot Syst. (2014) 74:965-983.
European Search Report in foreign counterpart application 16184260.4 dated Jan. 30, 2017 (9 pages).

* cited by examiner

METHOD FOR PLANTING SEEDS OR PLANTS AND A CORRESPONDING MACHINE

RELATED APPLICATION

This claims priority to German patent application number 102015217496.4, filed Sep. 14, 2015.

TECHNICAL FIELD

The present disclosure generally relates to a method for planting seeds or plants in a field and a corresponding machine.

BACKGROUND

When working on agricultural fields, satellite-supported positioning systems, among other things, are used to place individual seeds or plants at specific positions in the soil during seeding or planting operations. In this way one can achieve certain patterns (DE 102 51 114 A1) that also enable equipment lanes for field work, in particular weeding, in a direction across or diagonal to the original planting direction (DE 10 2005 101 686 A1) or that optimize solar irradiation (DE 10 2007 040 511 A1).

Usually the pattern is planned in advance on a computer, where the coordinates at which the seeds or plants are placed in the soil are established in order to achieve the desired pattern, or a first row is planted in the field and the subsequent rows are directed laterally to the first row opposite the forward direction of the seeding or planting machine (O. Schmittmann et al., "Development of a Precision Planter Drive for Coordinate-Controlled Planting of Seeds," Landtechnik 2010, 286).

This procedure works relatively well as long as the field is completely horizontal, since in the prior art the position determining means used to control the seeding or planting machine is based only on two-dimensional (horizontal) coordinates, i.e., it is based on a projection of the field at a (vertical) elevation of 0. In this regard see FIG. 1, which shows a projection of a square field in the horizontal plane with typical points for seeding or planting planned in two-dimensional space (or points that gradually result during the work on the field). However, when the field is inclined in one or two horizontal directions, for example has a mound or a depression as shown in FIG. 2, a planting of seeds or plants based only on a two-dimensional point determination leads to errors, since in going up a slope or going back down the slope, the seeding or planting machine in fact takes a different return path than the only horizontal distance measurement shows (because of the slope). For a slope angle $\alpha$, the path l that is actually traversed on the return is the horizontally measured distance x multiplied by a factor of $1/\cos \alpha$ (see FIG. 3). Because of this, the seed spacing in the forward direction in such cases is too large by the said factor, which leaves a desired working of the field in the transverse or diagonal direction impossible or at least makes it difficult, since the planned row spacings are no longer maintained.

This problem is easily recognized on the sides of the central hill on the field in FIG. 2: If the seed or plant material is planted with a single-row machine on the basis of a two-dimensional map and position determination, the distances between adjacent plants on the inclined surfaces will be greater than in the plane, both in the x and y directions. Working between the rows with a multi-row implement will not be possible because of the varying distances between the plants. It should be noted that probably a multi-row seeding or planting machine will actually be used, and with such a machine, the spacings between adjacent plants across the forward direction will necessarily remain constant, but they will vary along the forward direction going up and down slopes.

It was in fact proposed, for work on a hillside, to take into account the then reduced spacings projected on the horizontal, and thus to put adjacent swaths in the horizontal projection closer to each other than on a horizontal field (EP 1 475 609 A2), but this does not have any effect on the planting of seeds or plants in the forward direction of the machine. The said error would thus continue to exist. This is analogously true even for advance path plannings that take into account the three-dimensional shape of the field (J. Jin et al., Coverage Path Planning on Three-Dimensional Terrain for Arable Farming, Journal of Field Robotics 28(3), 424-440 (2011) and I. A. Hamed, Intelligent Coverage Path Planning for Agricultural Robots and Autonomous Machines on Three-Dimensional Terrain, J. Intell. Robot Syst. (2014) 74:965-983).

SUMMARY

This invention has the goal of avoiding the disadvantages of the prior art and making available a method for planting seeds or plants in a field and a corresponding machine that enables the maintenance of a specific spacing or pattern of the seeds or plants while planting, even on a non-horizontal field.

This invention is defined by the claims.

A method for planting seeds or plants in a field comprises the following steps:

- making available a machine for planting the seeds or plants that can be moved over the field in a working direction and that is equipped with a positioning system that yields two-dimensional, horizontal coordinates,
- establishing the spacing, measured in the working direction, at which adjacent seeds or plants are to be planted in the field,
- determining the slope of the field in the working direction of the machine, and
- planting the seeds or plants at the established spacing based on the two-dimensional coordinates output by the positioning system and the slope of the field in the working direction.

A corresponding arrangement for planting seeds or plants in a field that can be moved over the field in a working direction comprises:

- a positioning system that outputs two-dimensional, horizontal coordinates,
- means for establishing the spacing, measured in the working direction, at which adjacent seeds or plants are to be planted in the field,
- a device for determining the slope of the field in the working direction of the machine, and
- a control means that is connected and operable by signal transmission to a seeding or planting device for planting seeds or plants in order to control the seeding or planting device, to plant the seeds or plants in the field at the established spacing, based on the two-dimensional coordinates output by the positioning system and the slope of the field in the working direction.

In other words, the error of the two-dimensional positioning system when traversing rising or falling paths in the working direction of the machine is compensated by means of the slope of the field. If the desired spacing between two plants in the working direction of the machine, which can be input into a control means by an operator by means of an operator interface, is $l_{target}$ and if the machine covers the path x that is measured in the horizontal coordinate system and registered by means of the positioning system, then the seeding or planting device is activated precisely when the horizontal path $x=l_{target} \cdot \cos(\alpha)$ has been passed since the last activation, where $\alpha$ is the slope angle (see FIG. 3). In this way the plant spacing (measured along the ground surface) corresponds with the desired spacing, even if a positioning system that outputs two-dimensional coordinates is used. Thus working transversely or diagonally to the working direction of the machine can take place even on inclined areas.

The planning of the positions at which the seeds or plants are to be planted can take place during the planting operation. Then the horizontally covered path is registered by means of the positioning system and compensated with the slope $\alpha$ in order to maintain the desired spacing. On the other hand, preplanning can also take place, where the two dimensional target positions are determined by means of a three-dimensional map of the field and are input to the control means of the machine, which then activates upon reaching the target positions of the planting operation.

The positioning system, the device for determining the slope of the field, and/or the control means can be situated entirely or partially on board the machine or on board a machine pulling the machine. In the latter case the machine with the vehicle pulling it is to be seen as the "machine" in the meaning of the patent claims.

The slope of the field can be determined by means of a slope sensor and/or by means of a positioning system, which can comprise one or more antennas, which can be distributed over the machine in the working direction and/or in the transverse direction, by means of available elevation information, and/or by means of a three-dimensional map of the field that has been produced in any way in advance.

Preferably, the machine comprises a plurality of seeding or planting devices arranged side by side across the working direction, which are controlled separately from each other in the sense of maintaining a two-dimensional pattern of the planted seeds or plants. In this case it would also be conceivable to register different slope angles over the operating width of the machine (whether by means of the three-dimensional map of the field or a plurality of slope sensors) and to control individual seeding or planting units of the machine in correspondence with the relevant slope $\alpha$.

In addition to the spacing of adjacent seeds or plants in the working direction of the machine, the parameters of the pattern can also concern the relative offset of the seeds or plants of two adjacent rows across the working direction of the machine in the working direction of the machine.

In particular, when traversing adjacent swaths of the field in the sense of an orientation of the seeds or plants across the working direction, the machine is controlled (see DE 10 2005 101 686 A1, DE 10 2007 040 511 A1, and Schmittmann et al., op. cit.) so as to be able to work the field later in a direction running across and/or diagonal to the working direction of the machine, for example when controlling weeds, applying fertilizer, etc., or to achieve a desired direction of incidence for sunlight or wind. The said orientation can be planned in advance if the control means is controlled by means of target positions, or can be undertaken during the seeding operation by means of the positions of the planted seeds or plants achieved during a first transit of the field, where this can involve the positions registered by means of the time or point of activation of a machine or the actual positions of the seed material or the plants, which can be registered with a suitable sensor such as a camera (see DE 10 2012 203 761 A1).

BRIEF DESCRIPTION OF THE DRAWINGS

At least one example embodiment of the subject matter of this disclosure is understood by referring to FIG. 1 through FIG. 8 of the drawings.

DETAILED DESCRIPTION

Figure 3:
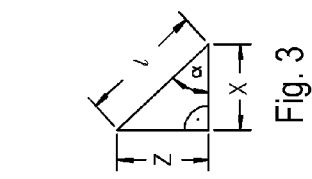
FIG. 3 shows a representation of the geometry in the planting of seeds or plants on a hillside.
Figure 1:
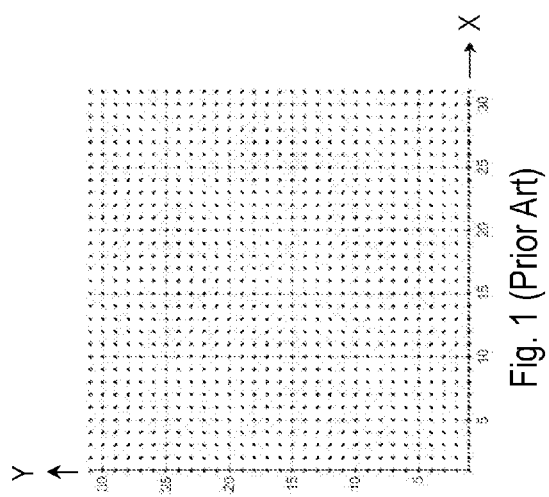
FIG. 1 shows a schematic, two-dimensional representation of a three-dimensional field with plants planted on it by a seeding machine that corresponds to the prior art.
Figure 2:
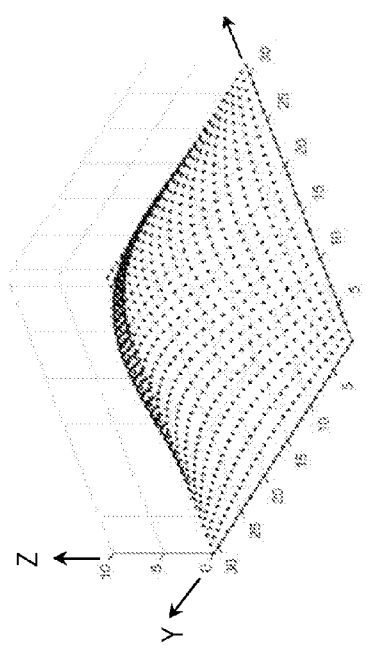
FIG. 2 shows a schematic, three-dimensional representation of the field in FIG. 1.

FIG. 1 shows a schematic, two-dimensional representation of a three-dimensional field with plants planted on it by a seeding machine that corresponds to the prior art. FIG. 2 shows a schematic, three-dimensional representation of the field in FIG. 1. FIG. 3 shows a representation of the geometry in the planting of seeds or plants on a hillside.

Figure 4:
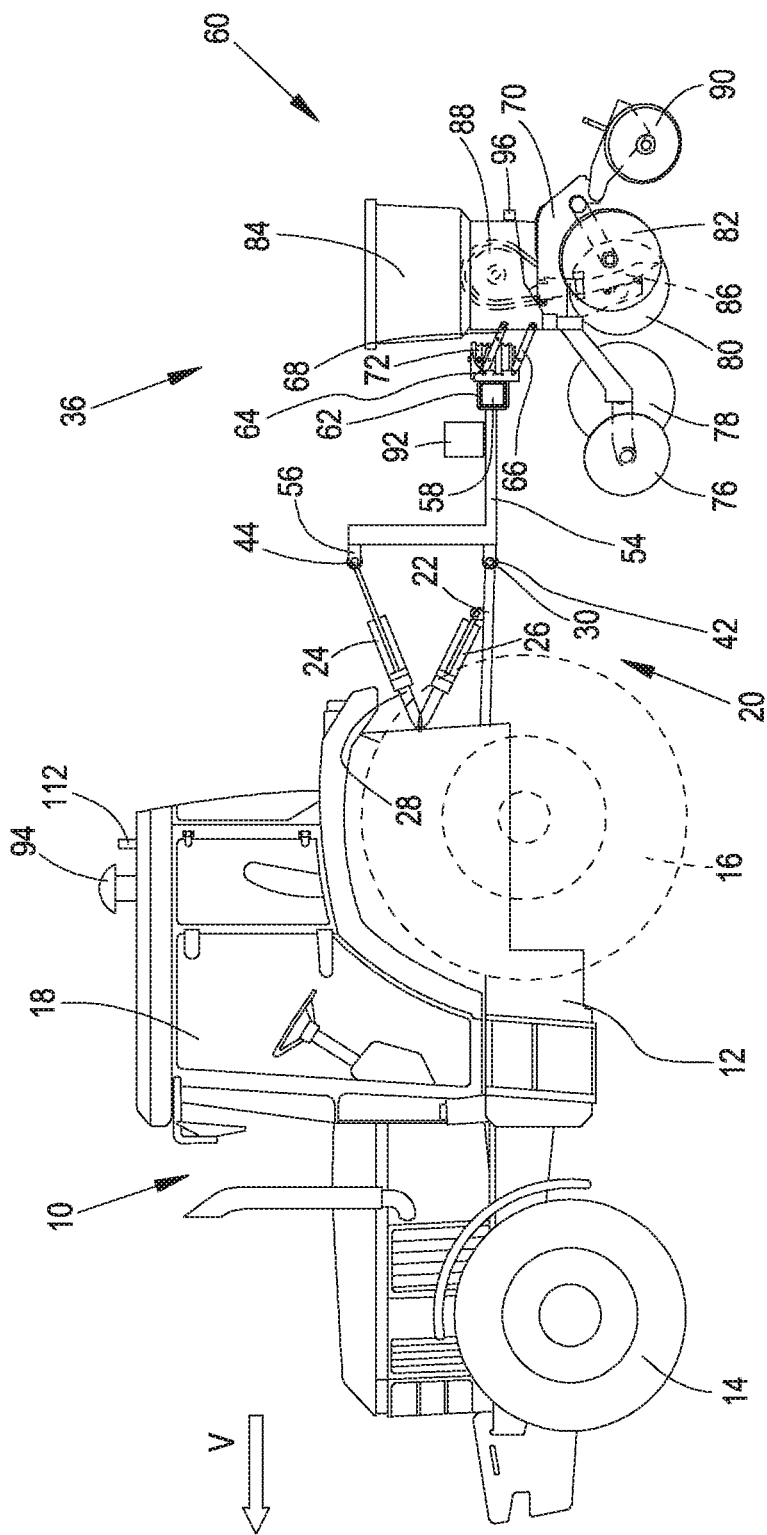
FIG. 4 shows a schematic side view of a machine for planting seeds, hitched to a tractor.

FIG. 4 shows a farm tractor 10 built on a frame 12 and supported on the ground by front steerable wheels 14 and rear drive wheels 16. An operator station is situated in a cabin 18. At the rear end of the frame 12 there is a three-point hitch 20, which is composed of two lower link arms 22 that are arranged side by side and an upper link arm 28 that is mounted above them. The lower link arms 22 are height-adjustable by means of pertinent, double acting hydraulic cylinders 26, which swivel the lower link arms 22 at their hitch point to frame 12 around horizontal axes that are oriented approximately transverse to the forward direction. The upper link arm 28 is designed as hydraulic cylinder 24 and accordingly is adjustable in length. By adjusting the hydraulic cylinders 26, rear hitch points 30 of the lower link arms 22 can be brought into a position that is suitable for hitching a seeding machine 36. By adjusting the length of the upper link arm 28, which can also be done purely mechanically by hand by the operator by means of a suitable screw adjuster instead of by means of the hydraulic cylinder 24, a rear hitch point 44 of the upper link arm 28 can be brought into a position suitable for hitching the seeding machine 36. At the rear end of the lower link arms 22, lower link arm hitch points 30, in the form of hooks that extend upward (or any other hitch points, for example hitch eyes, as described in DIN ISO 730-1 Agricultural Machines and Tractors—Rear Three Point Hitches—Part 1: Categories 1, 2, 3, and 4), are disposed in a substantially known way, while a likewise conventional upper link arm hitch point 44 is provided at the rear end of the upper link arm 28.

The hydraulic cylinder 24 of the upper link arm 28 serves only for one-time, initial adjustment of the position of the hitch point 44 and is not adjusted during field work, but rather is then locked (like the hydraulic cylinders 26 of the lower link arms 22). In the field the seeding machine 36 can be raised by retracting the cylinders 26 via a suitable valve (not shown), by the operator or the headland automation, and thus brought into the travel position, and then before working the next swath, the seeding machine 36 are analogously lowered back. Through this, the lower link arms 22 are lifted and again lowered by the hydraulic cylinders 26, so that the seeding machine 36 is also raised and lowered.

The seeding machine 36 comprises a mounting frame 54, which is attached to the lower link arm hitch points 30 of the lower link arms 22 by lower pins 42 and to the upper link arm hitch point 44 by an upper mounting element 56 and a pin. A cross member 58, which extends over the entire width of the seeding machine 36 and to which four seeding units 60 are attached, side by side in the embodiment shown, is attached to the frame 54. The seeding units 60 are attached to the cross member 58 via U-shaped brackets 62, which are connected to a console 64, which extends vertically at the rear of the cross member 58 and to which two link arms 66 and 68 are hinged, one above the other, and are additionally each hinged to a frame 70 of the seeding units 60. Together with the console 64 and frame 70, the link arms 66 and 68 form an adjustable parallelogram, which determines the height of the frame 70 above the ground. A pneumatic actuator 72 engages the lower link arm 66, on the one hand at the top to the console 64 and on the other hand at the bottom, and defines the position of the frame 70 and the pressure with which trench opening wheels 78 and 80 connected to frame 70 interact with the soil.

The frame 70 carries, in a substantially known way, a seed hopper 84, a seed tube 86, and a metering device 88 (in particular pneumatic, operating by a vacuum provided by a bladder, which is not shown), which one by one delivers individual seeds from the seed hopper 84 to the seed tube 86, which deposits the seed in a trench, which is made by the trench opening wheel 80, the working depth of which is preset by a gauge wheel 82. The trench is closed by a closing wheel 90. Another trench can be made by a trench opening wheel 78, whose working depth is preset by a gauge wheel 76. This additional trench can serve to hold fertilizers via an additional tube (not shown) and likewise closed by the closing wheel 90. For further details of the seeding units 60, one is referred to the disclosure of EP 2 517 545 A1, the disclosure of which is incorporated into these documents by reference. The seeding machine 36 could also be supported on wheels and pulled behind the tractor 10 on a drawbar, instead of the indicated coupling to a three point hitch 20. The seeding machine 36 is an example of a machine for planting seeds and could in another embodiment also plant young plants or seedlings.

An antenna of a positioning system 94 is mounted on the roof of the cabin 18 and receives signals from satellites, for example the GPS, Galileo, and/or Glonass systems, in order to determine its position. The position data are sent by the positioning system 94 to a control means 92, which in turn is connected to the actuators 96 of the seeding units 60, which can be activated by the control means 92, to deposit a seed into the soil each time. Alternatively, the positioning system 94 could be mounted on the seeding machine 36, likewise the control means 92 and an inertia or gravity sensor 112 to register the slope of the field in the forward direction V. If the positioning system 94, the control means 92, and the inertia or gravity sensor 112 are situated on the tractor 10, as shown in FIGS. 4 and 5, the combination of seeding machine 36 and tractor 10 that is shown is to be seen as the "machine" for planting seeds or plants in the meaning of the claims.

Figure 6:
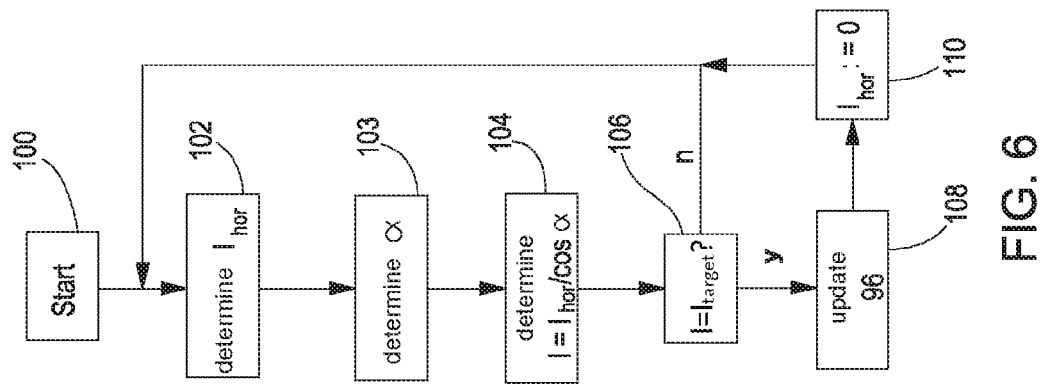
FIG. 6 shows a flowchart according to which the control of the machine takes place.
Figure 5:
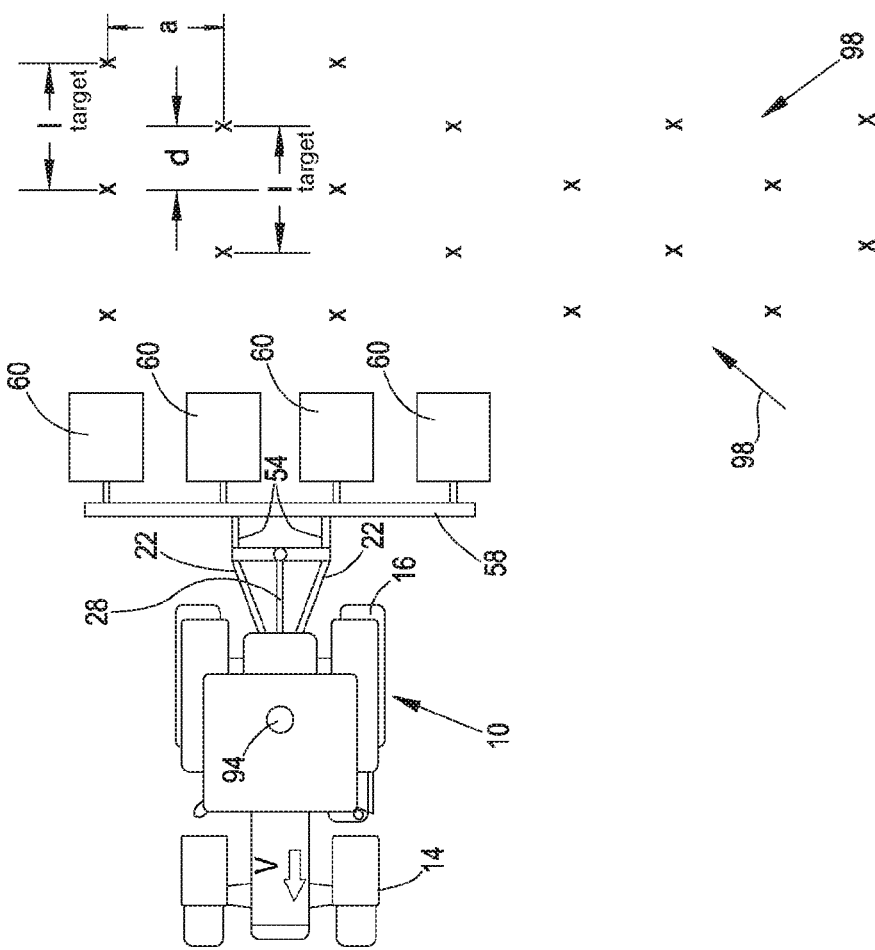
FIG. 5 shows a top view of the machine in FIG. 4 during the planting of seeds in a field.

In a seeding operation the control means 92 operates in the manner shown in FIGS. 5 and 6. The tractor 10 is moved over the field in its working direction V in swaths that are as straight as possible, steered manually or by the positioning system 94, and in each adjacent swath deposits four rows of seeds in the soil. In this case, adjacent swaths can be traversed immediately one after the other in time. In each case, after covering a distance $l_{target}$ (which can be input to the control means 92 by any means, for instance through an operator interface in the cabin 18, or can be externally preplanned and transmitted to the control means 92 in any way), the actuators 96 are activated to deposit a seed in the soil (indicated by the x marks). Adjacent seeding units 60 deposit their seeds offset from each other by a distance d (which can be input into the control means 82 in a manner analogous to $l_{target}$), which can correspond, for example, to half of $l_{target}$, as shown. In this case, any pattern that also enables a so-called equidistant planting (with approximately equal spacings between all plants) is conceivable. Also, the field can subsequently be traversed diagonal to the forward direction V, as indicated by arrow 98. It would also be conceivable to leave the offset d at zero, i.e., to plant the plants in a square or rectangular pattern, which enables a later travel and working across the working direction V.

The control means 92 operates according to the flow diagram in FIG. 6.

After initiation of step 100, the horizontal path $l_{hor}$, that has been traversed since the last seed deposit of the relevant seeding unit 60 (this can be a point determined by the activation of the actuator 96 or a point registered by a separate sensor, see DE 10 2012 203 761 A1, which senses the position of the seed in the trench), is determined in step 102. After this reference is made to the signals from the positioning system 94, where at first only the horizontal coordinates of the three-dimensional position signals are used. By means of the said horizontal coordinates, the path $l_{hor}$, which corresponds to the horizontal spacing from the last seed deposit, is calculated (i.e., $l_{hor}=(x2+y2)^{1/2}$ is set, where x and y are the paths in any orthogonal directions since the last seed deposit of the relevant seeding unit 60, for example in the east-west and in the north-south directions). Accordingly, the positioning system 94 can utilize a Cartesian coordinate system, as described, or any other coordinate system.

In the next step 103, the slope angle α of the region of the field being worked in each case (or an average of the slope α over a last covered distance) in the working direction V is determined. The signals of the positioning system 94 and/or the inertia or gravity sensor 112 or a three-dimensional map of the field stored in a memory of the control means 92 can be used for this.

In the next step 104, the path l along the field covered since the last seed deposit of the relevant seed unit 60 is determined (as shown in FIG. 3) by dividing $l_{hor}$ (see step 102) by cos α (see step 103). Thus, the slope-corrected path that was traversed is determined.

In step 106 a test is made to see if the path l is equal to $l_{target}$. If this is not the case, step 102 is repeated, otherwise step 108, in which the control means 92 instructs the actuator 96 to deposit a seed in the soil. The time between the activation of the actuator 96 and the actual arrival of the seed in the trench can be taken into account in step 108, see DE 10 2012 203 761 A1. Step 108 is followed by step 110, in which $l_{target}$ is reset to zero and then the process is continued with step 102.

The orientation of the rows of seeds or plants, i.e., their orientation with respect to the north-south direction or another reference axis (and thus the orientation of the working direction V on the field) can be planned in advance, for example on a farm computer, or established on site in the field, in particular by the operator of the tractor 10 making a first swath over the field and in doing so planting the first four rows of plants. The following plant rows are then directed across the driving direction from the plant rows already present (see O. Schmittmann et al.) in order to obtain the desired planting pattern, where the positioning of the adjacent rows preferably takes place automatically by a steering system of the tractor 10 connected to the positioning system 94 and taking into account the lateral slope of the field (see EP 1 475 609 A2). Analogously, the exact position of the deposition of the first plant(s) in the field can be preset by means of a preplanned map or preset by the operator of the tractor 10.

If a preset map of the desired plant positions or at least the orientation of the plant rows and/or a reference position of a plant is used, it is initially preplanned on any computer (which is to be seen as a component of the control means in the meaning of the claims) on which a map of the field is available, and sent to a memory of the control means 92 of the seeding machine 36 and used by the control to control the seeding machine 36. In this case there is also the possibility of traversing adjacent paths offset in time, for example by initially omitting one or more swaths and covering it or them later, since only in this case, other than when planning is done during seeding, is the side slope-dependent position of the seeding or planting operation in cross section already known. In the latter (manually controlled) case, the desired plant positions are generated during the seeding or planting.

Figure 7:
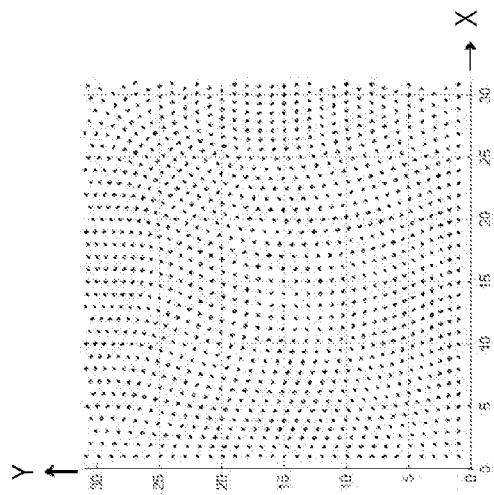
FIG. 7 shows a representation in correspondence with FIG. 1, but with establishment of the planting of the seeds or plants in the field according to the invention.
Figure 8:
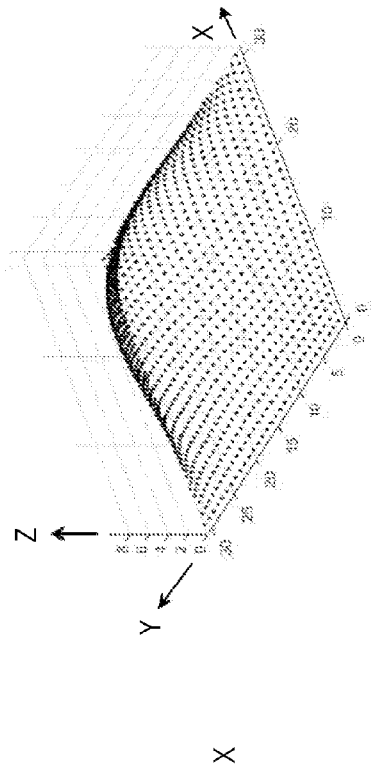
FIG. 8 shows a schematic, three-dimensional representation of the field in FIG. 7.

In the case of a hilly field, as shown in FIG. 2, one obtains a seed pattern as in FIGS. 7 and 8, in which equal spacings of the plants in the transverse direction and in the working direction are achieved in each case by adjusting the spacings of the plants in the working direction V of the seeding machine 36 to the slope of the field in the forward direction.

What is claimed is:

1. A method for planting seeds or plants in a field, comprising the following steps:
   making available a machine for planting the seeds or plants, the machine movable over the field in a working direction and equipped with a positioning system that outputs two-dimensional, horizontal coordinates,
   establishing a spacing measured in the working direction, the seeds or plants being planted in the field with the spacing between adjacent seeds or plants,
   determining a slope of the field along the working direction of the machine,
   planting the seeds or plants at the established spacing based on the two-dimensional coordinates output by the positioning system and the slope of the field in the working direction, and
   activating the machine to plant a seed or plant when $x = l_{target} \cdot \cos(\alpha)$, where x is a horizontal distance traveled since the last activation according to the two-dimensional positioning system, $l_{target}$ is the established spacing, and $\alpha$ is the determined slope of the field.

2. The method of claim 1, wherein the slope of the field is determined by means of at least one of a slope sensor, elevation information made available from the positioning system which comprises at least one antenna, and a three-dimensional map of the field.

3. The method of claim 1, wherein the machine comprises a plurality of seeding or planting devices disposed laterally side by side transverse to the working direction, which are controlled separate from each other to maintain a two-dimensional pattern of the planted seeds or plants.

4. The method of claim 3, wherein in addition to the spacing of adjacent seeds or plants in the working direction of the machine, at least one parameter of the pattern relates to the relative offset of seeds or plants in the working direction of the machine of two rows that are adjacent along the working direction of the machine.

5. The method of claim 4, wherein the machine as it traverses adjacent swaths of the field is controlled corresponding to a position of the seeds or plants across the working direction in order to enable subsequent work in the field in a direction running at least one of across and diagonal to the working direction of the machine.

6. An arrangement for planting seeds or plants in a field, having a machine for planting the seeds or plants, the machine movable over the field in a working direction and coupled to a positioning system that outputs two-dimensional, horizontal coordinates, having:
   means for establishing a spacing measured in the working direction at which adjacent seeds or plants are to be planted in the field,
   a device for determining a slope of the field along the working direction of the machine, and
   a control means, connected by signal transmission to a seeding or planting device for planting the seeds or plants, said control means being operable to control the seeding or planting device and plant the seeds or plants in the established spacing in the field, based on the two-dimensional coordinates output by the positioning system and the slope of the field in the working direction;
   wherein the control means is operable to activate the seeding or planting device to plant a seed or plant when $x = l_{target} \cdot \cos(\alpha)$, where x is a horizontal distance traveled since the last activation according to the two-dimensional positioning system, $l_{target}$ is the established spacing, and $\alpha$ is the determined slope of the field.

7. The arrangement of claim 6, wherein the device for determining the slope of the field comprises at least one of a slope sensor and the positioning system, the device consists of at least one antenna, and the device provides elevation information and a three-dimensional map of the field.

8. The arrangement of claim 6, wherein the machine comprises a plurality of seeding or planting devices disposed laterally side by side across the working direction, and the control means is operable to separately control each of said plurality of seeding or planting devices to maintain a two-dimensional pattern of the planted seeds or plants.

9. The arrangement of claim 8, wherein in addition to the spacing of adjacent seeds or plants along the working direction of the machine, at least one parameter of the pattern relates to the relative offset of seeds or plants in the working direction of the machine of two rows that are adjacent along the working direction of the machine.

10. The arrangement of claim 6, wherein the control means is operable to control the machine as it goes over adjacent passes in the field to position the seeds or plants across the working direction in order to enable subsequent work in the field in a direction running at least one of across and diagonal to the working direction of the machine.

\* \* \* \* \*